(12) United States Patent
Tadano et al.

(10) Patent No.: US 11,553,114 B2
(45) Date of Patent: Jan. 10, 2023

(54) CAMERA UNIT HAVING A STAND AND PIVOTABLE ARMS

(71) Applicant: Sony Interactive Entertainment Inc., Tokyo (JP)

(72) Inventors: Katsuhisa Tadano, Kanagawa (JP); Naoki Ogishita, San Mateo, CA (US); Nozomu Uchida, Tokyo (JP); Kenta Kidoba, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/321,951

(22) Filed: May 17, 2021

(65) Prior Publication Data
US 2021/0377426 A1 Dec. 2, 2021

Related U.S. Application Data

(60) Provisional application No. 63/031,622, filed on May 29, 2020.

(51) Int. Cl.
*H04N 5/225* (2006.01)
*G03B 17/56* (2021.01)
(Continued)

(52) U.S. Cl.
CPC ............. *H04N 5/2252* (2013.01); *F16B 2/06* (2013.01); *F16M 11/04* (2013.01);
(Continued)

(58) Field of Classification Search
CPC .. H04N 5/225; H04N 5/2252; H04N 5/22521; H04N 5/2253; H04N 5/2254;
(Continued)

(56) References Cited

U.S. PATENT DOCUMENTS 5,855,343 A * 1/1999 Krekelberg .......... F16M 13/022
248/126
6,738,094 B1 * 5/2004 Minami ................. H04N 7/142
348/E5.025

(Continued)

FOREIGN PATENT DOCUMENTS

JP 10136241 A 5/1998
JP 10191137 A 7/1998
(Continued)

OTHER PUBLICATIONS

International Search Report and Written Opinion for corresponding PCT Application No. PCT/JP2021/019980, 13 pages, dated Jul. 6, 2021.

*Primary Examiner* — Twyler L Haskins
*Assistant Examiner* — Akshay Trehan
(74) *Attorney, Agent, or Firm* — Matthew B. Dernier, Esq.

(57) ABSTRACT

Disclosed herein is a camera unit including a camera main body, and a stand configured to support the camera main body, in which the camera main body includes a light receiving section and a main body housing in which the light receiving section is accommodated, the stand includes a first arm portion configured to support the main body housing for pivotal motion such that an orientation in an upward and downward direction of an optical axis of the light receiving section is adjustable, and a second arm portion attached for pivotal motion to the first arm portion, and the main body hosing has a protrusion that projects downwardly at a lower portion of the camera unit in a use state of the camera unit.

12 Claims, 10 Drawing Sheets

(51) Int. Cl.
*F16M 11/04* (2006.01)
*F16M 13/02* (2006.01)
*F16B 2/06* (2006.01)
*G06F 1/16* (2006.01)

(52) U.S. Cl.
CPC ......... *F16M 13/022* (2013.01); *G03B 17/561* (2013.01); *F16M 2200/022* (2013.01); *G03B 17/566* (2013.01); *G06F 1/1605* (2013.01); *G06F 1/1607* (2013.01); *G06F 1/1686* (2013.01); *H04N 5/225251* (2018.08)

(58) Field of Classification Search
CPC ............... H04N 5/2256; H04N 5/2257; H04N 5/2251–2258; G03B 17/02; G03B 17/561; G03B 17/566; F16B 2/02–185; F16B 2/20–248; F16B 5/06; F16M 11/04; F16M 11/041; F16M 13/02; F16M 13/022; G06F 1/1686; G06F 1/1605; G06F 1/1607
See application file for complete search history.

(56) References Cited

U.S. PATENT DOCUMENTS

| | | | |
|---|---|---|---|
| 7,048,454 B2* | 5/2006 | Sitoh | F16M 11/126 396/428 |
| 10,184,606 B2 | 1/2019 | Nokuo | |
| 2012/0056973 A1* | 3/2012 | Yano | G03B 21/145 348/E7.083 |
| 2018/0017204 A1* | 1/2018 | Nokuo | H04N 5/2252 |

FOREIGN PATENT DOCUMENTS

| | | | | | |
|---|---|---|---|---|---|
| JP | H10191137 A | * | 7/1998 | | G06F 1/00 |
| JP | 2000152037 A | | 5/2000 | | |
| JP | 2004112731 A | * | 4/2004 | | H04N 5/222 |
| JP | 2004112731 A | | 4/2004 | | |
| JP | 2006172361 A | * | 6/2006 | | G06F 1/16 |
| JP | 2006172361 A | | 6/2006 | | |
| JP | 2010147535 A | | 7/2010 | | |
| JP | 2012054813 A | | 3/2012 | | |
| JP | 2013001300 A | | 1/2013 | | |
| JP | 2013001300 A | * | 7/2013 | | B60N 3/04 |
| JP | 2018010117 A | | 1/2018 | | |

* cited by examiner

CAMERA UNIT HAVING A STAND AND PIVOTABLE ARMS

BACKGROUND

The present disclosure relates to a camera unit that is attached to an upper edge of a display device.

JP 2018-10117A discloses a camera unit that includes a camera and a stand and that is attached to an upper edge of a display device (for example, a television set or a display of a personal computer). The camera unit disclosed in Patent Document 1 adopts a structure that has three centers of rotation provided for mounting of the camera unit on a display device and for adjustment of the orientation of the camera.

SUMMARY

Such a camera unit as described above preferably has a more simplified configuration with which it can be attached to a display device.

It is desirable to provide a camera unit that has a simplified configuration with which it can be attached to a display device.

A camera unit for solving the problem described above includes a camera main body, and a stand configured to support the camera main body, in which the camera main body includes a light receiving section and a main body housing in which the light receiving section is accommodated, the stand includes a first arm portion configured to support the main body housing for pivotal motion such that an orientation in an upward and downward direction of an optical axis of the light receiving section is adjustable, and a second arm portion attached for pivotal motion to the first arm portion, and the main body hosing has a protrusion that projects downwardly at a lower portion of the camera unit in a use state of the camera unit.

DETAILED DESCRIPTION OF THE PREFERRED EMBODIMENT

In the following, an embodiment of the present disclosure (hereinafter referred to as the present embodiment) is described with reference to the drawings.

Figure 1:
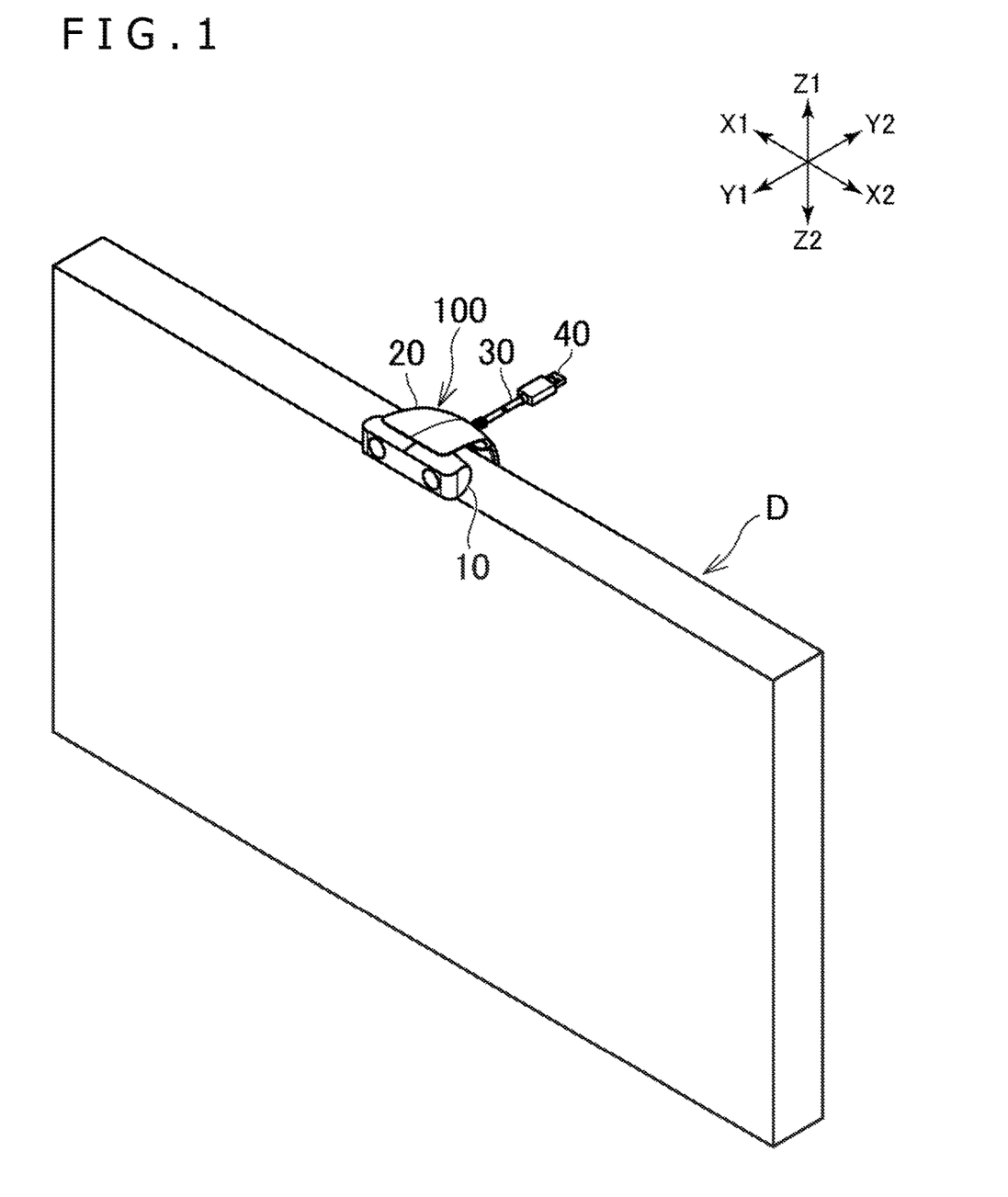
FIG. 1 is a perspective view depicting a state in which a camera unit according to an embodiment of the present disclosure is attached to an upper end of a display device.
Figure 2:
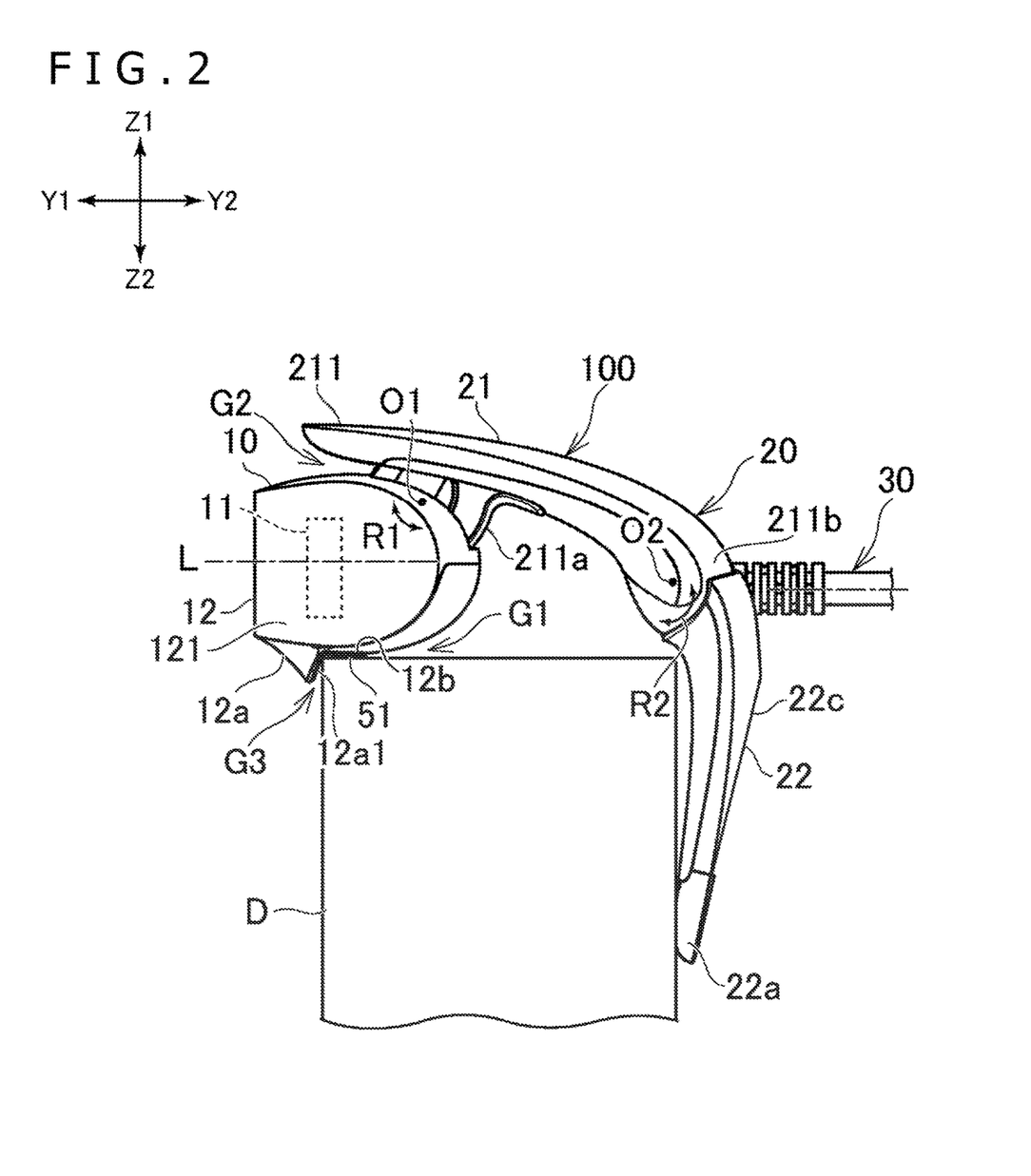
FIG. 2 is a side elevational view depicting a state in which the camera unit according to t e present embodiment is attached to the upper edge of the display device.
Figure 3:
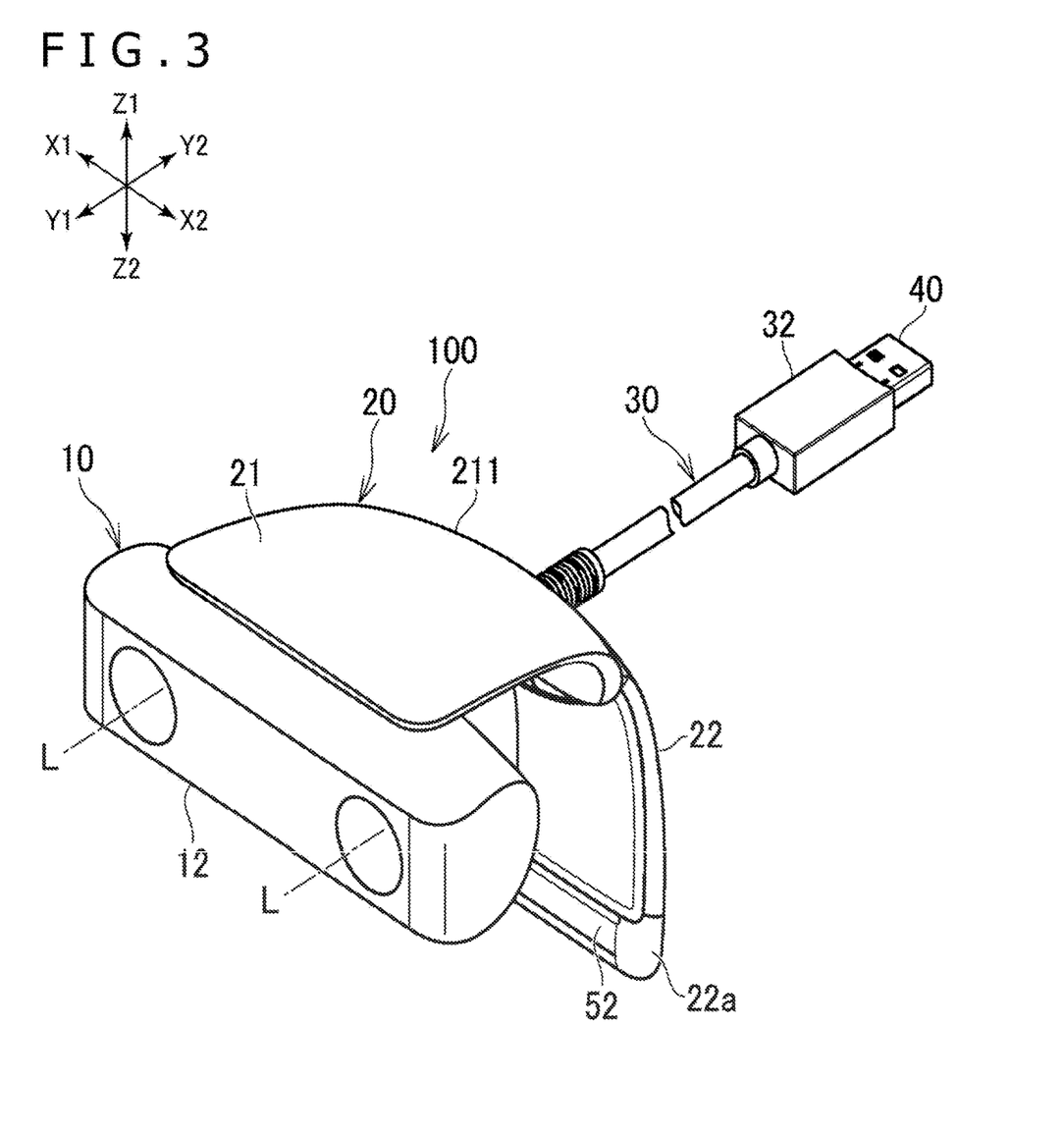
FIG. 3 is a perspective view of the camera unit according to the present embodiment as viewed obliquely from above and front.
Figure 4:
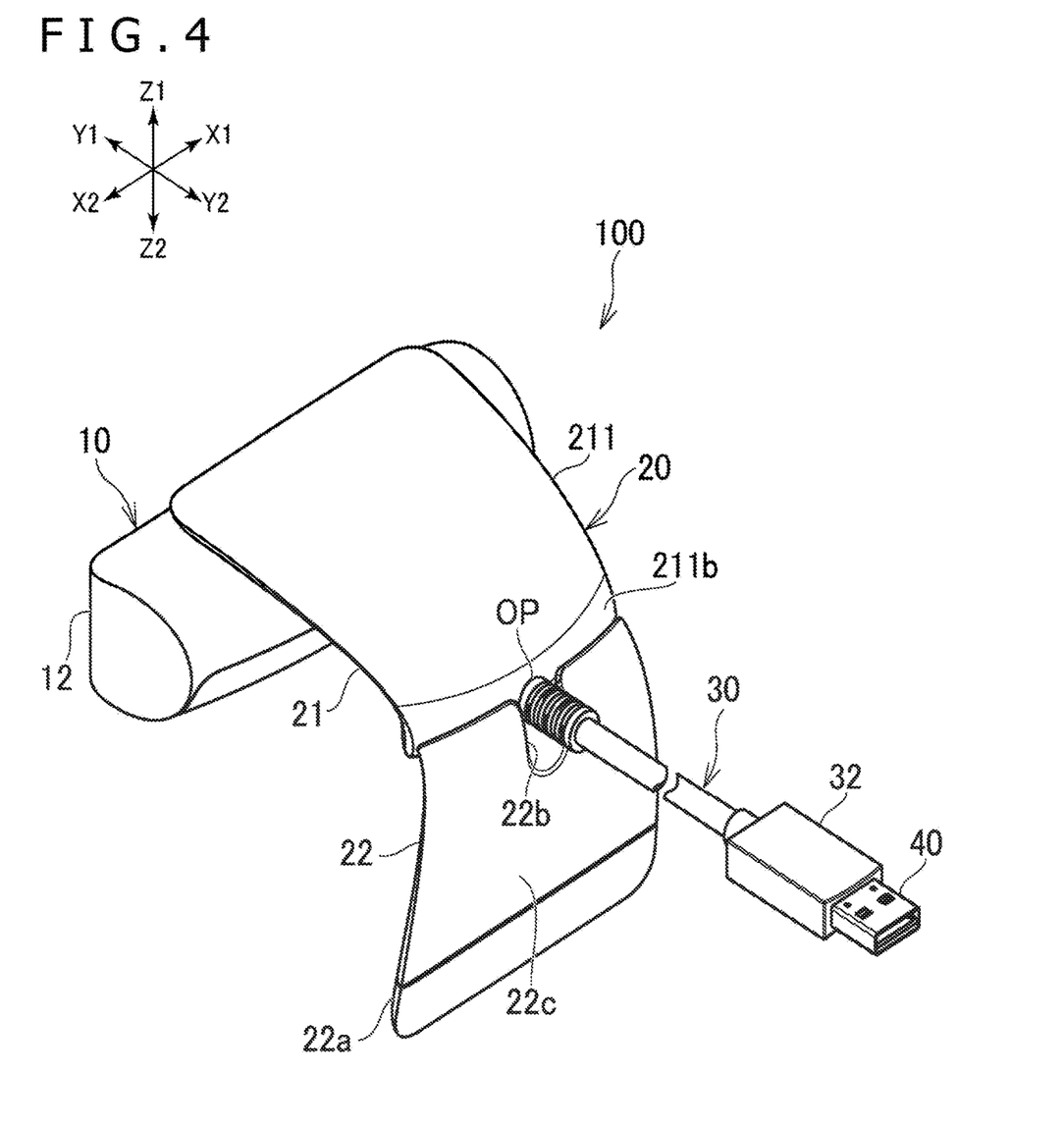
FIG. 4 is a perspective view of the camera unit according to the present embodiment as viewed obliquely from above and rear.
Figure 5:
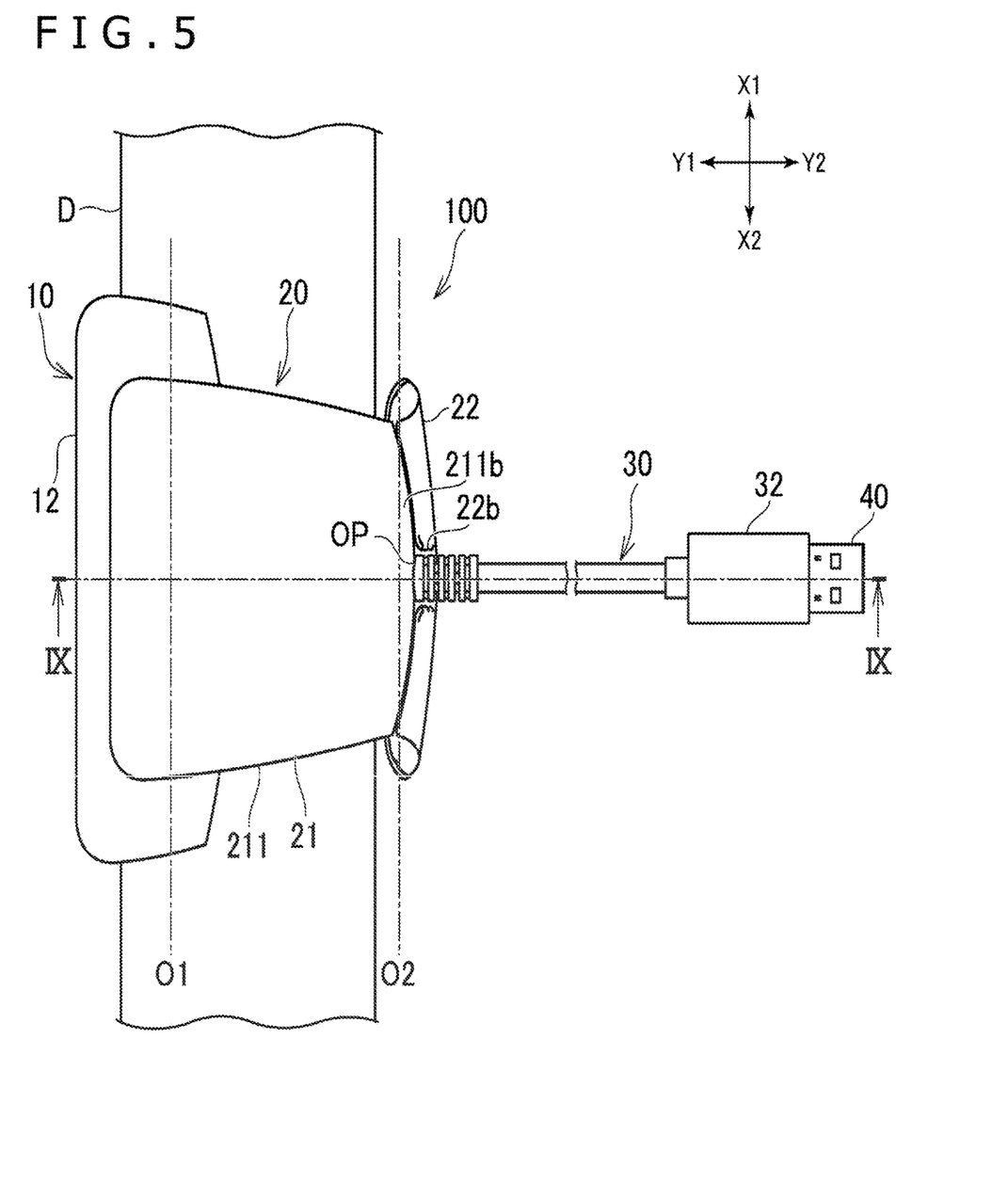
FIG. 5 is a top plan view depicting a state in which the camera unit according to the present embodiment is attached to the upper edge of the display device.
Figure 6:
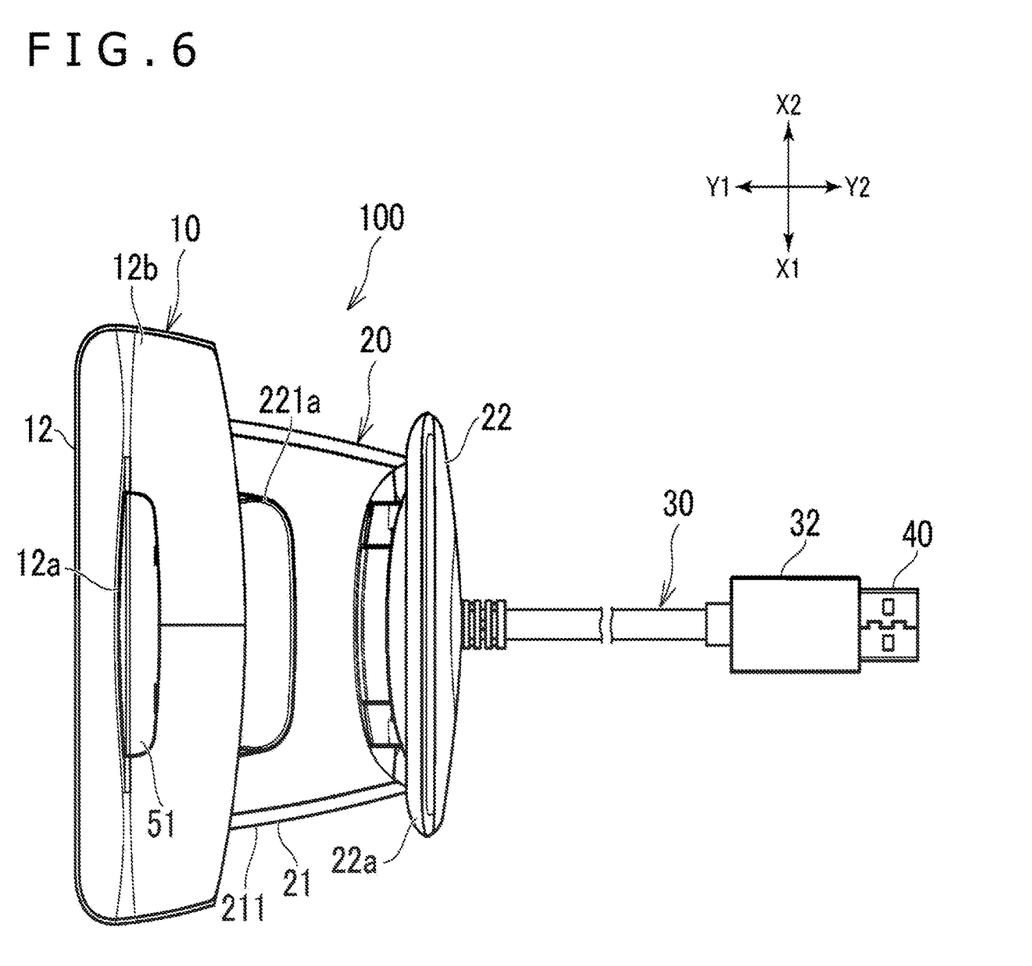
FIG. 6 is a bottom plan view of the camera unit according to the present embodiment as viewed from below.
Figure 7:
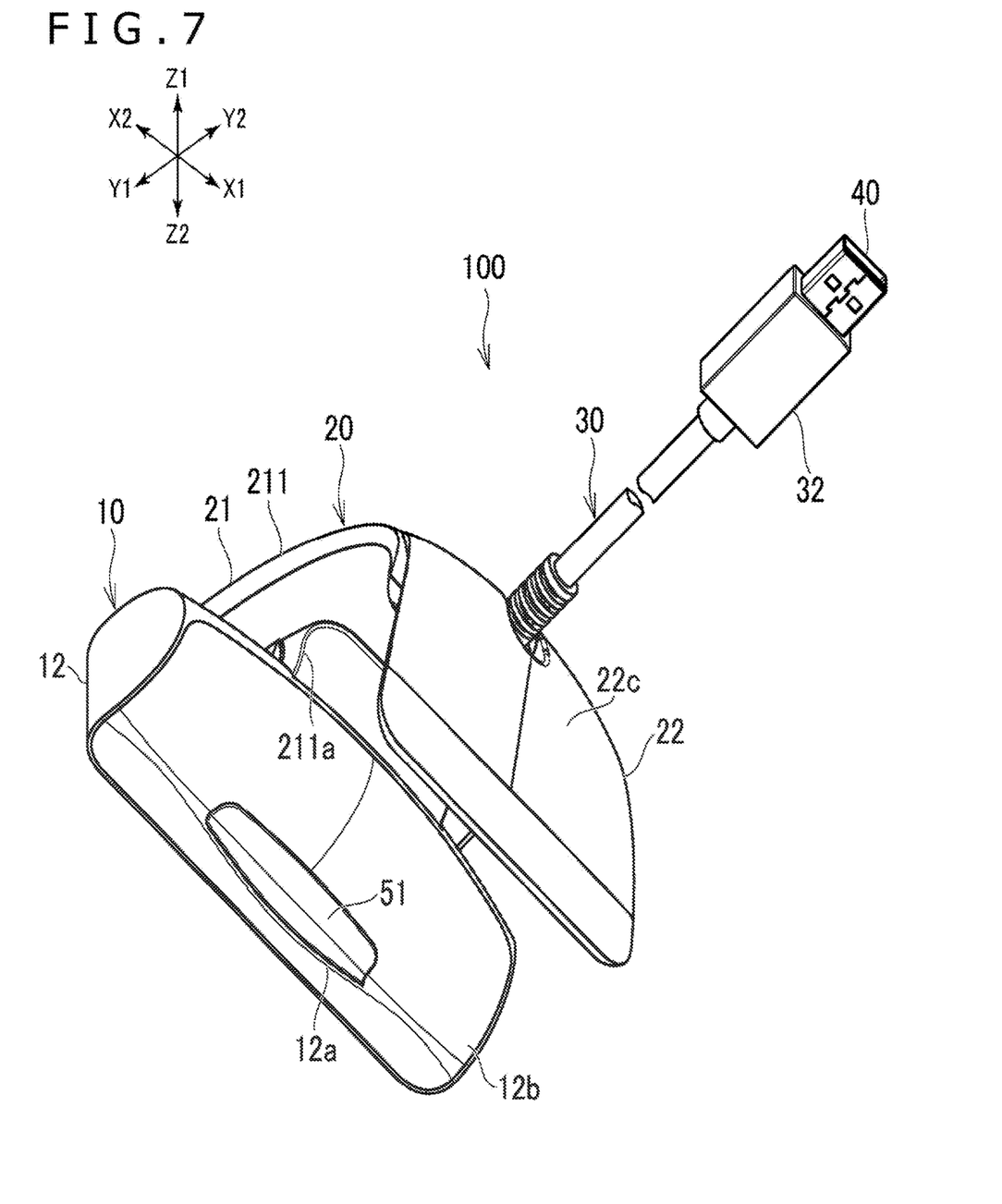
FIG. 7 is a perspective view of the camera unit according to the present embodiment as viewed obliquely from rear and below.
Figure 8:
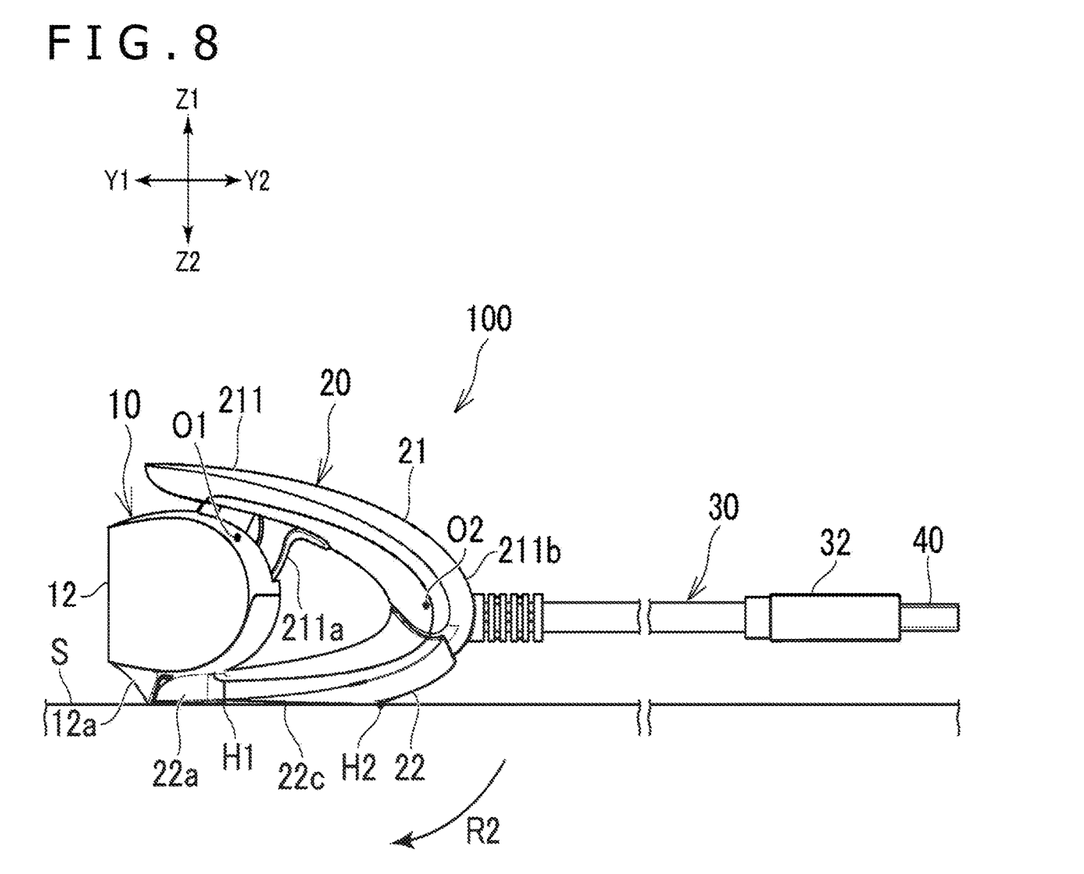
FIG. 8 is a side elevational view depicting a state in which a second arm portion is positioned in a closed position in the camera unit according to the present embodiment.
Figure 9:
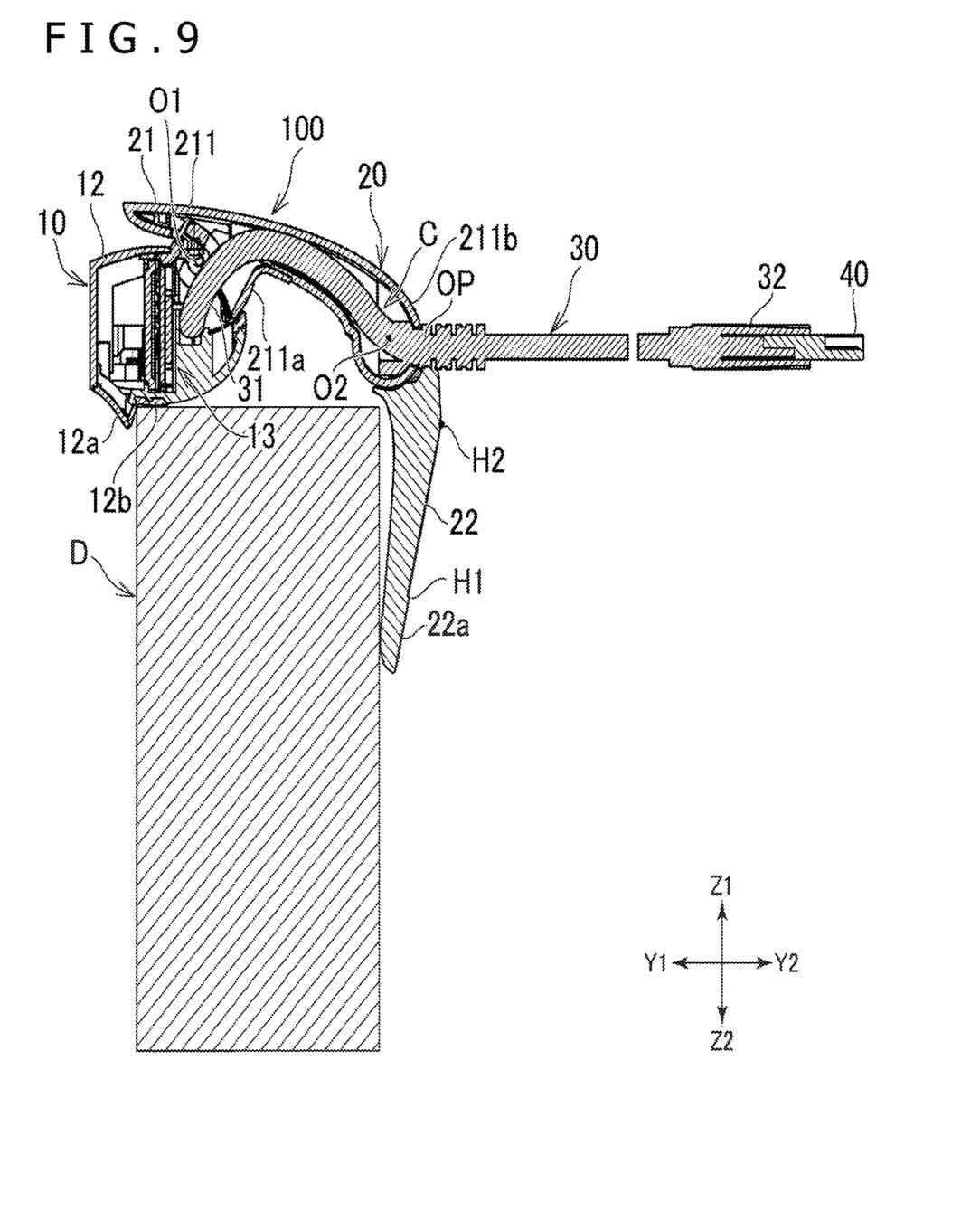
FIG. 9 is a sectional view depicting a cut face where the camera unit is cut along a IX-IX cut line of FIG. 5.
Figure 10:
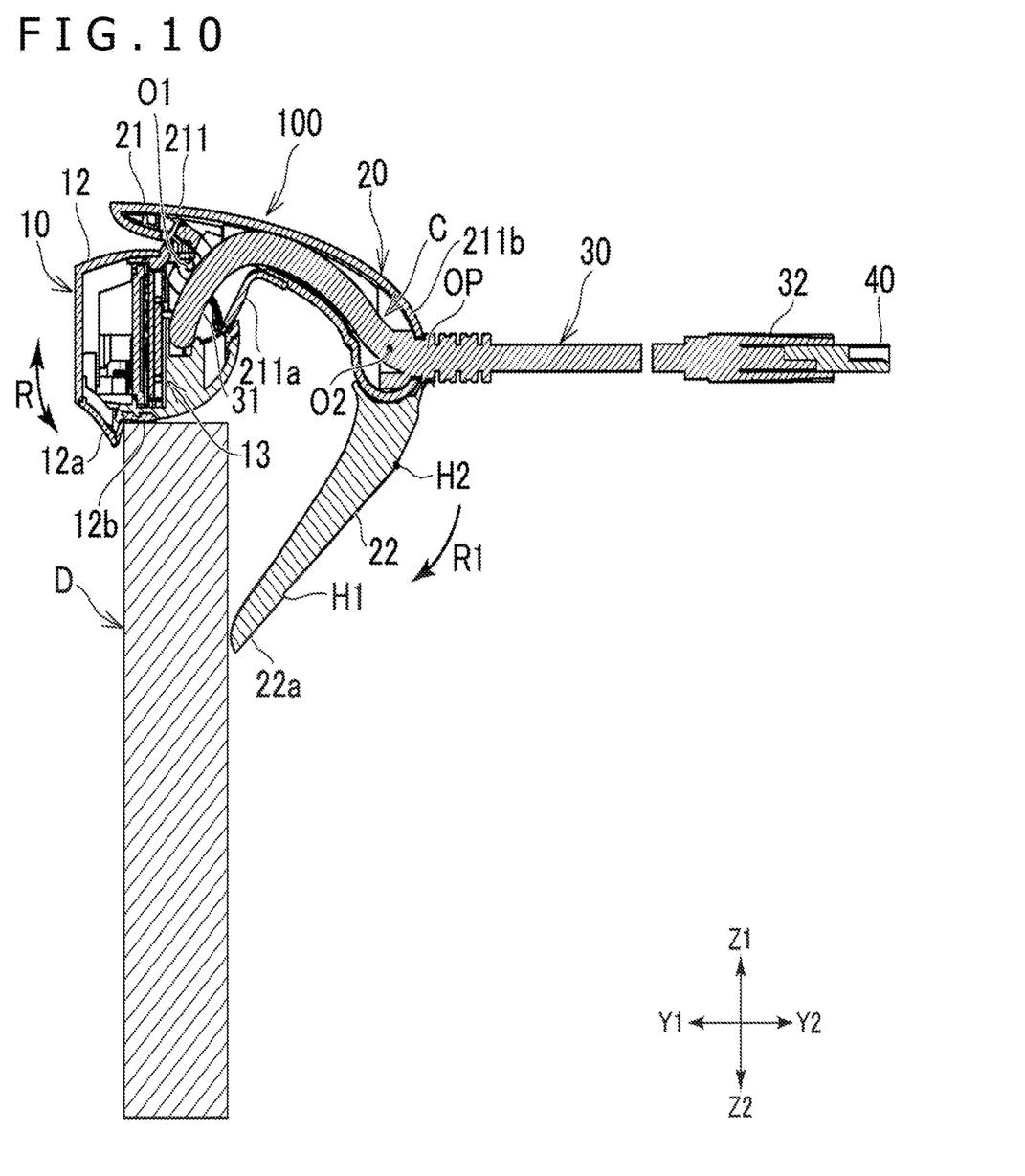
FIG. 10 is a sectional view depicting a state in which the camera unit is attached to a display device that is thinner than the display device depicted in FIG. 9.

FIG. 1 is a perspective view depicting a state in which a camera unit according to the present embodiment is attached to an upper end of a display device. FIG. 2 is a side elevational view depicting a state in which the camera unit according to the present embodiment is attached to the upper edge of the display device. FIG. is a perspective view of the camera unit according to the present embodiment as viewed obliquely from above and front. FIG. 4 is a perspective view of the camera unit according to the present embodiment as viewed obliquely from above and rear. FIG. 5 is a top plan view depicting a state in which the camera unit according to the present embodiment is attached to the upper edge of the display device. FIG. 6 is a bottom plan view of the camera unit according to the present embodiment as viewed from below. FIG. 7 is a perspective view of the camera unit according to the present embodiment as viewed obliquely from rear and below. FIG. 8 is a side elevational view depicting a state in which a second arm portion is positioned in a closed position in the camera unit according to the present embodiment. FIG. 9 is a sectional view depicting a cut face where the camera unit is cut along a TX-TX cut line of FIG. 5. FIG. 10 is a sectional view depicting a state in which the camera unit is attached to a display device that is thinner than the display device depicted in FIG. 9.

In the present specification, X1 and X2 indicated in FIG. 1 and so forth denote a rightward direction and a leftward direction, respectively, Y1 and Y2 denote a forward direction and a rearward direction, respectively and Z1 and Z2 denote an upward direction and a downward direction, respectively. The direction in which a light receiving section 11 hereinafter described is oriented, namely, the direction in which an optical axis L (refer to FIGS. 2 and 3) of the light receiving section 11 extends, is the forward direction.

Further, a portion on the front side of each member described in the description of the present embodiment is referred to as a front portion, a portion on the rear side is referred to as a rear portion, a portion on the upper side is referred to as an upper portion, and a portion on the lower side is referred to as a lower portion. Further, a face on the front side of each member described in the description of the present embodiment is referred to as a front face, a face on the rear side is referred to as a rear face, a face on the upper side is referred to as an upper face, and a face on the lower side is referred to as a lower face.

[Overview of Camera Unit 100]

As depicted in FIG. 1, the camera unit 100 is attached to an upper edge of a display device (for example, a television set or a display of personal computer) D. In the present specification, the state of the camera unit 100 attached to the upper edge of the display device D is referred to also as use state.

The camera unit 100 includes a camera main body 10, a stand 20, and a cable 30. The camera unit 100 is connected to an information processing apparatus (not depicted) such as a game device or a personal computer through the cable 30 and transmits image data acquired by a light receiving section 11 provided on the camera main body 10 to the information processing apparatus. The information processing apparatus generates a three-dimensional image on the basis of the image data acquired by two light receiving sections 11 provided on the camera main body 10. However, this is not restrictive, and one light receiving section 11 may be provided, and the image generated by the information processing apparatus a two-dimensional image.

[Camera Main Body 10]

The camera main body 10 includes as depicted in FIGS. 2, 9, and other figures, the light receiving section 11, main body housing 12 that configures an exterior of the camera main body 10, and a circuit board 13 on which various electronic parts such as the light receiving section 11 are mounted.

The main body housing 12 accommodates in the inside thereof the light receiving section 11, the circuit board 13, and other components. The main body housing 12 is supported by the stand 20 such that the orientation of the light receiving section 11 (optical axis L) can be adjusted in an upward and downward direction.

The light receiving section 11 includes a lens module and a light receiving element and captures external light. The camera main body 10 includes two light receiving sections 11 positioned to be spaced from each other in a leftward and rightward direction. It is to be noted that the light receiving section 11 is schematically depicted in FIG. 2 and illustration of a detailed configuration thereof is omitted.

The main body housing 12 has, at a lower portion 121 thereof in a use state of the camera unit 100, a lower face 12b that is to be placed on an upper face of the display device D. Further, the main body housing 12 has, at the lower portion 121 thereof in the use state of the camera unit 100, a protrusion 12a that projects downwardly. The protrusion 12a projects, in the use state of the camera unit 100, downwardly so as to be caught by a front face of the display device D in front of the lower face 12b.

It is to be noted that, though not depicted, it is sufficient if it includes a microphone accommodated in the main body housing 12. Further, it is sufficient if the camera main body 10 transmits sound data acquired by the microphone to the information processing apparatus through the cable 30.

The cable 30 is provided so as to be connected to the camera main body 10 and extend rearwardly. In particular, the cable 30 is electrically connected at a front end portion 31 thereof (refer to FIGS. 9 and 10) to the circuit board 13 accommodated in the main body housing 12 of the camera main body 10. Further, the cable 30 has a connector 40 provided at a rear end portion 32 thereof. Although the connector 40 is, for example, a USB (Universal Serial Bus) connector, it may otherwise be a connector of another type.

[Stand 20]

The stand 20 includes a first arm portion 21 and a second arm portion 22.

The first arm portion 21 includes an arm housing 211 that configures an exterior of the first arm portion 21. The arm housing 211 has a support portion 211a that supports the main body housing 12 for pivotal motion provided thereon such that the orientation of the optical axis L of the light receiving section 11 in the upward and downward direction can be adjusted.

The support portion 211a supports the main body housing 12 for pivotal motion around a pivotal motion center O1 extending in the leftward and rightward direction through a hinge (not depicted). The support portion 211a extends downwardly at a front portion of the first arm portion 21 and supports an upper portion of the main body housing 12 through the hinge. In particular, the support portion 211a is configured so as to suspend and support the main body housing 12. It is sufficient if the hinge used here is a torque hinge that can hold the camera main body 10 at an optional position. By pivoting the camera main body 10 in an R1 direction indicated in FIG. 2 around the pivotal motion center O1, the orientation of the optical axis L of the light receiving section 11 is adjusted. It is to be noted that, although the support portion 211a extending downwardly from the first arm portion 21 is indicated in the present embodiment, this is not restrictive, and it is sufficient if a configuration in which at least an upper portion of the main body housing 12 is supported by the first arm portion 21 is adopted.

The second arm portion 22 is attached for pivotal motion to the first arm portion 21 such that the distance thereof to the camera main body 10 can be adjusted. In the present embodiment, the second arm portion 22 is attached at an end portion thereof to a rear portion of the first arm portion 21 for pivotal motion around a pivotal motion center O2 extending to the leftward and rightward direction through a hinge (not depicted). It is sufficient if the hinge used here is a torque hinge that can hold the second arm portion 22 at an optional position. In the present embodiment, the pivotal motion center O2 is disposed rearwardly and downwardly with respect to the pivotal motion center O1. It is to be noted that, although the pivotal motion center O1 and the pivotal motion center O2 do not physically appear on the appearance of the camera unit 100, they are depicted in FIGS. 2 and 5 is order to facilitate movements of the associated portions.

The second arm portion 22 moves between a closed position and an open position by pivotally moving in an R2 direction depicted in FIG. 2 around the pivotal motion center O2. The closed position is a position at which the second arm portion 22 is positioned in the proximity the camera main body 10, and the open position is a position in which the second arm portion 22 is spaced away from the camera main body 10. FIG. 2 depicts a state in which the second arm portion 22 is positioned at the open position. FIG. 8 depicts a state in which the second arm portion 22 is positioned at the closed position.

Further, as depicted in FIGS. 9 and 10, part of the inside of the arm housing 211 of the first arm portion 21 forms a cavity C. In the cavity C, part of the cable 30 is accommodated. Further, as depicted in FIG. 4 and so forth, an opening OP is formed in the rear portion 211b of the arm housing 211 so as to be directed rearwardly. The cable 30 extends rearwardly through the inside of the main body housing 12 and the first arm portion 21 and is exposed from the opening OP of the arm housing 211 and then extends rearwardly further. In particular, a portion of the cable 30 on the front side with respect to the opening OP is accommodated in the main body housing 12 and the arm housing 211 and cannot be viewed from the outside.

Further, as depicted in FIG. 4, a cutout 22b is formed at the end portion of the second arm portion 22 such that the opening OP of the arm housing 211 and the second arm portion 22 do not overlap with each other. Consequently, the cable 30 is avoided from interfering with the second arm portion 22.

[Use State of Camera Unit 100]

The camera unit 100 is used in such a manner that the display device D is sandwiched in a forward and rearward direction the protrusion 12a provided on the main body housing 12 and a tip portion 22a of the second arm portion 22 as depicted in FIG. 2 and so forth.

The protrusion 12a is caught by a front face of the display device D in the use state. By such a configuration as just described, the camera unit 100 attached to the upper edge of the display device D is suppressed from being displaced rearwardly.

The protrusion 12a is provided at a front portion of the main body housing 12. Therefore, in the use state, a portion of the main body housing 12 in the rear of the protrusion 12a, namely, the lower face 12b of the main body housing can be placed on the upper face of the display device D. Since the main body housing 12 can be placed directly on the upper face of the display device D in this manner, the posture of the camera unit 100 in the use state is stabilized. Further, since the main body housing 12 can be placed directly on the upper face of the display device D, the camera unit 100 can be used in a state in which the light receiving section 11 is positioned close to the screen of the display device D in the upward and downward direction. Therefore, a user who is in front of the display device D can be recognized easily by the camera.

In the use state, the second arm portion 22 contacts, at the tip portion 22a thereof, with a rear face of the display device D. Consequently, the camera unit 100 attached to the upper edge of the display device D is prevented from dropping rearwardly, and the posture of the camera unit 100 is stabilized.

In a use state, the second arm portion 22 takes the open position. It is sufficient if the open position of the second arm portion 22 is adjusted according to the width (thickness) of the display device D in the forward and rearward direction. FIG. 9 depicts a state in which the camera unit 100 is attached to the display device D that has a comparatively great width in the forward and rearward direction. When the camera unit 100 is attached to the display device D that has a comparatively great width in the forward and rearward direction, the open position of the second arm portion 22 is a position in which the portion 22a thereof is spaced by a comparatively great distance from the camera main body 10.

FIG. 10 depicts a state in which the camera unit 100 is attached to the display device D that has a comparatively small width (thickness) the forward and rearward direction. When the camera unit 100 is attached to the display device D that has a comparatively small width in the forward and rearward direction, the open position of the second arm portion 22 is a position in which the tip portion 22a thereof is positioned comparatively closer to the camera main body 10. In particular, the open position of the second arm portion 22 in a case where the camera unit 100 is attached to the display device D depicted in FIG. 10 is a position to which the second arm portion 22 is pivoted in an R2 direction (a clockwise direction) indicated in FIG. 10 from that in a case where the camera unit 100 is attached to the display device D depicted in FIG. 9.

It is to be noted that the camera unit 100 not only may be used in a state in which it is attached to an upper edge of a display device but also may be placed and used on a table S such as, for example, a television stand. In this case, it is sufficient if, as depicted in FIG. 8, an outer face 22c of the second arm portion 22 (a lower face in the closed position) is placed on the table S in a state in which the second arm portion 22 is positioned at the closed position by pivoting the same in the R2 direction (the clockwise direction depicted in FIG. 8). It is to be noted that, in the present embodiment, the outer face 22c of the second arm portion 22 is shaped so as to include a rounded curved face from a design point of view. Further, the outer face 22c (lower face in the closed position) of the second arm portion 22 includes a first holding point H1 for holding the posture of the second arm portion 22 and a curved face including a second holding point H2 for holding the posture of second arm portion 22 in the rear with respect to the first holding point H1 in a case where it is viewed from the leftward or rightward direction of the second arm portion 22 as depicted in FIGS. 8 to 10. The first holding point H1 and the second holding point H2 are portions that contact with the table S. In this manner, it is sufficient if the camera unit 100 is configured such that the posture thereof is kept by the two holding points as viewed in side elevation in the use state in which the second arm portion 22 is positioned at the closed position. It is sufficient if the first holding point H1 is a vertex of a protrusion that projects, for example, from part of the outer face 22c. Further, it is sufficient if the second holding point H2 is part of a linear portion that extends in the leftward and rightward direction, for example, on the curved face of the second arm portion 22. By such a configuration as described above, it is possible to adopt a curved face shape for the outer face 22c of the second arm portion 22 and bring the second arm portion 22 to the closed position to stabilize the posture of the camera unit 100 in the state in which the camera unit 100 is placed on the table S. It is to be noted that the shape of the outer face 22c of the second arm portion 22 is not limited to a shape that includes a curved face and may be a shape including a flat face. In this case, by placing the flat face formed on the outer face 22c of the second arm portion 22 on the table S, the posture of the camera unit 100 can be stabilized.

[Details of Other Configurations]

The lower face 12b of the main body housing is curved face that is inclined upwardly toward the rear. Therefore, in a state in which the camera unit 100 is attached to the display device such that the optical axis L of the light receiving section 11 extends in parallel to the upper face of the display device D, a gap G1 is generated in the upward and downward direction between a lower portion of the main body housing 12 and the upper face of the display device D.

Further, as depicted in FIG. 2, in a state in which the camera unit 100 is attached to the display device D in such a manner that the optical axis L of the light receiving section 11 extends in parallel to the upper face of the display device D, a gap G2 is formed in the upward and downward direction between an upper portion of the main body housing 12 and a tip portion of the arm housing 211. The gap G2 is formed according to the length in the upward and downward direction of the support portion 211a that extends downwardly.

Pivotal motion of the camera main body 10 in clockwise direction in FIG. 2 is permitted according to each width of the gap G1 and the gap G2 in the upward and downward direction. In other words, it is permitted that the optical axis L of the light receiving section 11 is inclined in the upward direction in a state in which the camera unit 100 is attached to the display device D.

It is to be noted that, while the present embodiment is directed to an example in which the lower face 12b of the main body housing 12 includes a curved face, this is not restrictive, and the lower face 12b of the main body housing 12 may be configured so as to include a flat face that is inclined upwardly toward the rear. Also in such a structure as described, it is permitted that the optical axis P of the light receiving section 11 is inclined in the upward direction in a state in which the camera unit 100 is attached to the display device D.

Further, a rear face 12a1 of the protrusion 12a is inclined forwardly toward the downward. Therefore, in a state in which the camera unit 100 is attached to the display device D such that the optical axis L of the light receiving section 11 extends in parallel to the upper face of the display device D as depicted in FIG. 2, a gap G3 is formed in the forward and rearward direction between the protrusion 12a and a front face of the display device D. Pivotal motion of the camera main 10 in the counterclockwise direction in FIG. 2 is permitted according to the width of the gap G3 in the forward and rearward direction. In other words, in the state in which the camera unit 100 is attached to the display device P, it is permitted that the optical axis of the light receiving section 11 is inclined in the downward direction.

Further, it is sufficient if the camera unit 100 has a slip-proof member for causing friction provided at a portion thereof at which to contact with the display device D. In particular, it is sufficient if a slip-proof member is provided on the lower face 12b of the main body housing 12 and an inner face of the tip portion 22a of the second arm portion 22.

In the present embodiment, as depicted in FIGS. 2 and 7, a slip-proof member 51 having a substantially L shape in side elevation view is provided over a range from the lower face 12b to the rear face 12a1 of the protrusion 12a of the main body housing 12. Further, as depicted in FIG. 3, a belt-like slip-proof member 52 is provided on the inner face of the tip portion 22a of the second arm portion 22 so as to extend in the leftward and rightward direction.

It is to be noted that it is sufficient if the slip-proof members 51 and 52 are made of, for example, an elastomer resin and formed by two-color molding on the main body housing 12 and the second arm portion 22.

Further, it is sufficient if, as depicted in FIG. 8, the second arm portion 22 has a length that does not cause, in the state in which it is positioned at the closed position, interference with an end of the protrusion 12a in its projection direction. Further, it is sufficient if the tip portion 22a of the second arm portion 22 is shaped so as to follow the shape of the rear face 12a1 of the protrusion 12a in the state in which the second arm portion 22 is in the closed position. In particular, it is sufficient if the front face of the portion 22a in the closed position is inclined downwardly toward the front. By adopting such a configuration as described, a length of the second arm portion 22 can be secured. Although various sizes are supposed for the width (thickness) of the display device D in the forward and rearward direction, by sufficiently securing the length of the second arm portion 22, it is possible to attach the camera unit 100 to a greater number of types of the display device D. Further, by configuring the second arm portion 22 in such a way not to interfere with the tip of the protrusion 12a in the projection direction, namely, not to overlap with the protrusion 12a in the upward and downward direction, the size in the upward and downward direction of the camera unit 100 in the state in which the second arm portion 22 is positioned in the closed position can be minimized.

It is to be noted that it is sufficient if the protrusion 12a is formed symmetrically in the leftward and rightward direction with respect to an axis of symmetry at line that passes the center of the main body housing 12 in the leftward and rightward direction. For example, the protrusion 12a may be shaped so as to extend from a left end portion to a right end portion of the main body housing 12. Alternatively, protrusions 12a may be formed in a spaced relationship from each other in the leftward and rightward direction at a left and portion and a right end portion of the main body housing 12.

[Summary]

As described above, the camera unit 100 according to the present embodiment is configured such that it is attached to an upper edge of the display device D by sandwiching the display device D by protrusion 12a provided on the camera main body 10 and the tip portion 22a of the second arm portion 22. Consequently, the configuration by which the camera unit 100 can be attached in a stable posture to the display device D and besides the orientation of the optical axis L of the light receiving section 11 can be adjusted can be implemented at two locations for pivotal motion (the pivotal motion center O1 and the pivotal motion center O2). In other words, the camera unit 100 that is simple in configuration and that includes a small number of parts can be provided.

Further, as described hereinabove, the cable 30 is connected at the front end portion 31 thereof to the camera main body 10 and extends rearwardly from the camera main body 10 so as to be accommodated in the arm housing 211 of the first arm portion 21 and be exposed from the opening OP formed at the rear portion 211b of the arm housing 211. By adopting such a configuration as described, in the state in which the camera unit 100 is attached to an upper edge of the display device D, the cable 30 does not interfere with the upper edge of the display device D. Therefore, the cable 30 is not affected by a load from the upper edge of the display device D. Further, since the cable 30 is exposed rearwardly from the rear face of the display device D, the visibility of the cable 30 drops and the appearance of the camera unit 100 is improved as viewed from a user who is in front of the display device to which the camera unit 100 is attached.

It should be understood by those skilled in the art that various modifications, combinations, sub-combinations and alterations may occur depending on design requirements and other factors insofar as they are within the scope of the appended claims or the equivalents thereof.

What is claimed is:

1. A camera unit comprising:
   a camera main body; and
   a stand configured to support the camera main body; wherein
   the camera main body includes a light receiving section and a main body housing in which the light receiving section is accommodated,
   the stand includes a first arm portion configured to support the main body housing for pivotal motion such that an orientation in an upward and downward direction of an optical axis of the light receiving section is adjustable, and a second arm portion attached for pivotal motion to the first arm portion, and
   the main body housing has a protrusion that projects downwardly at a lower portion of the camera unit in a use state of the camera unit.

2. The camera unit according to claim 1, wherein
   the first arm portion includes an arm housing having an opening at a rear portion thereof, and
   the camera unit further comprises a cable that is electrically connected to a circuit board accommodated in the main body housing, that extends rearwardly passing the inside of the main body housing and the arm housing and that is exposed from the opening.

3. The camera unit according to claim 1, wherein the main body housing is supported for pivotal motion at an upper portion thereof by the first arm portion.

4. The camera unit according to claim 1, wherein the second arm portion is attached to the first arm portion for pivotal motion between a closed position at which the second arm portion is positioned close to the camera main body and an open position at which the second arm portion is spaced away from the camera main body.

5. The camera unit according to claim 4, wherein the protrusion is provided at a position at which the protrusion does not interfere with the second arm portion in a state in which the second arm portion is positioned at the closed position.

6. The camera unit according to claim 4, wherein a lower face of the second arm portion in the state in which the second arm portion is at the closed position includes a first holding point for holding a posture of the second arm portion and a curved face that includes a second holding point for holding a posture of the second arm portion in the rear with respect to the first holding point, as viewed from a leftward and rightward direction.

7. The camera unit according to claim 1, wherein a rear face of the protrusion is inclined forwardly toward the downward.

8. The camera unit according to claim 1, wherein a lower face of the main body housing is inclined upwardly toward the rear.

9. The camera unit according to claim 1, wherein the main body housing has a slip-proof member on a lower face thereof.

10. The camera unit according to claim 9, wherein the slip-proof member is provided over a range from the lower face of the main body housing to the rear face of the protrusion.

11. The camera unit according to claim 1, wherein a slip-proof member is provided on an inner face of a tip portion of the second arm portion.

12. The camera unit according to claim 1, wherein the protrusion is provided projecting downwardly so as to be caught by a front face of a display device in the use state of the camera unit.

* * * * *